United States Patent
Lesnau, IV et al.

(10) Patent No.: US 10,119,614 B2
(45) Date of Patent: *Nov. 6, 2018

(54) GASKET WITH A COMPRESSION LIMITER

(71) Applicant: FEDERAL-MOGUL CORPORATION, Southfield, MI (US)

(72) Inventors: Edward Lesnau, IV, Livonia, MI (US); Jim Zwick, Brighton, MI (US); Marcin Fracz, Waterford, MI (US)

(73) Assignee: Tenneco Inc., Lake Forest, IL (US)

( * ) Notice: Subject to any disclaimer, the term of this patent is extended or adjusted under 35 U.S.C. 154(b) by 524 days.

This patent is subject to a terminal disclaimer.

(21) Appl. No.: 14/708,922

(22) Filed: May 11, 2015

(65) Prior Publication Data

US 2015/0240947 A1 Aug. 27, 2015

Related U.S. Application Data

(62) Division of application No. 13/362,459, filed on Jan. 31, 2012, now Pat. No. 9,027,935.

(51) Int. Cl.
*F02F 11/00* (2006.01)
*F16J 15/02* (2006.01)
*F16J 15/08* (2006.01)

(52) U.S. Cl.
CPC ........... *F16J 15/022* (2013.01); *F02F 11/002* (2013.01); *F16J 15/0825* (2013.01)

(58) Field of Classification Search
CPC .............................. F16J 15/0818; F16J 15/127
See application file for complete search history.

(56) References Cited

U.S. PATENT DOCUMENTS

| | | | | |
|---|---|---|---|---|
| 3,519,281 A | * | 7/1970 | Teucher | F16J 15/123 277/601 |
| 4,191,389 A | * | 3/1980 | Jelinek | F16B 43/001 277/637 |
| 5,121,933 A | * | 6/1992 | Silvers | F16J 15/123 277/592 |
| 5,988,651 A | * | 11/1999 | Miyaoh | F16J 15/0818 277/593 |

(Continued)

FOREIGN PATENT DOCUMENTS

| | | |
|---|---|---|
| EP | 1852638 A1 | 11/2007 |
| JP | 2003314691 A | 11/2003 |

(Continued)

*Primary Examiner* — Vishal A Patel
(74) *Attorney, Agent, or Firm* — Robert L. Stearns; Dickinson Wright, PLLC

(57) ABSTRACT

A multi-layer gasket including first and second functional layers, each having an opening. Each of the functional layers includes a compression bead, and the compression beads contact and seal against one another when the gasket is compressed between a cylinder head and an engine block. At least one of the functional layers includes a stopper disposed between the compression bead and the opening. The stopper has a gear-like shape including a plurality of circumferentially spaced teeth. Each tooth extends upwardly from a plane by a distance which is less than the combined height of the compression beads. When the gasket is compressed between the cylinder head and engine block, the stopper ensures that the compression beads remain elastically biased against one another and maintain a gas-tight seal.

2 Claims, 9 Drawing Sheets

(56) References Cited

U.S. PATENT DOCUMENTS

| | | | |
|---|---|---|---|
| 6,209,883 B1* | 4/2001 | Kashmerick | F16J 15/0818 277/593 |
| 6,250,645 B1* | 6/2001 | Udagawa | F16J 15/0818 277/592 |
| 6,283,480 B1* | 9/2001 | Miura | F16J 15/0825 277/593 |
| 8,123,230 B2* | 2/2012 | Yoshijima | F16J 15/0825 277/593 |
| 2003/0197334 A1* | 10/2003 | Werz | F16J 15/0825 277/593 |
| 2004/0160017 A1 | 8/2004 | Diez et al. | |
| 2004/0217552 A1 | 11/2004 | Sueda | |
| 2005/0173868 A1 | 8/2005 | Hatamura et al. | |
| 2005/0206091 A1* | 9/2005 | Detmann | F16J 15/0818 277/594 |
| 2006/0055121 A1 | 3/2006 | Tiefenbach et al. | |
| 2006/0066059 A1* | 3/2006 | Fritz | F16J 15/0818 277/593 |
| 2006/0097459 A1* | 5/2006 | Hohe | F16J 15/0818 277/593 |
| 2006/0175763 A1* | 8/2006 | Duckek | F16J 15/0818 277/593 |
| 2006/0192347 A1* | 8/2006 | Popielas | C23C 8/02 277/593 |
| 2006/0290072 A1* | 12/2006 | Chen | F16J 15/0825 277/593 |
| 2007/0090608 A1* | 4/2007 | Ueta | F16J 15/0818 277/593 |
| 2007/0158918 A1* | 7/2007 | Belter | F16J 15/0825 277/593 |
| 2007/0262536 A1* | 11/2007 | Werz | F16J 15/0825 277/593 |
| 2008/0012235 A1 | 1/2008 | Fritz | |
| 2008/0093807 A1* | 4/2008 | Flemming | F16J 15/0818 277/593 |
| 2009/0072493 A1* | 3/2009 | Duckek | F16J 15/0818 277/593 |
| 2009/0200753 A1* | 8/2009 | Popielas | C22C 19/03 277/593 |
| 2011/0101626 A1* | 5/2011 | Prehn | F16J 15/0818 277/592 |
| 2012/0098210 A1 | 4/2012 | Schmitt et al. | |
| 2013/0087980 A1* | 4/2013 | Lafrenz | F16J 15/0825 277/593 |
| 2014/0103610 A1* | 4/2014 | Okano | F16J 15/0825 277/593 |

FOREIGN PATENT DOCUMENTS

| | | |
|---|---|---|
| JP | 2004293596 A | 10/2004 |
| JP | 2006144897 A | 6/2006 |
| JP | 2009543987 A | 12/2009 |
| WO | 2008004723 A1 | 1/2008 |
| WO | 2010149774 A1 | 12/2010 |

* cited by examiner

GASKET WITH A COMPRESSION LIMITER

This divisional application claims priority to U.S. application Ser. No. 13/362,459, filed Jan. 13, 2012, and is incorporated herein by reference.

BACKGROUND OF THE INVENTION

1. Field of the Invention

The invention relates to static gaskets of the type used to establish a gas-tight seal between two members to be clamped together, and more particularly to multi-layer gaskets such as cylinder head gaskets.

2. Related Art

In establishing a gas-tight seal between two members to be clamped together, such as a cylinder head and an engine block, it is common to use a static cylinder head gasket having multiple layers. Generally, at least one of the layers of the multi-layer gasket, sometimes referred to as a functional layer, has a compression bead to establish the fluid tight seal. Another of the layers, sometimes referred to as a distance layer, is configured to abut the functional layer in an effort to establish the gas-tight seal by compressing the compression bead of the functional layer. Unfortunately, while fastening the cylinder head to the engine block, the compression bead can be over-compressed and substantially flattened. If the compression bead is over-compressed, in addition to losing its ability to maintain a gas-tight seal, fatigue cracks can form in the area of the compression bead during the initial clamping or while in use. If formed, fatigue cracks ultimately reduce the ability of the static gasket to maintain a gas-tight seal, thereby diminishing the life and performance of the engine.

Some gasket manufacturers have begun producing multi-layer gaskets including compression limiters for preventing flattening of the compression bead when the gasket is compressed between the cylinder head and the engine block. These compression limiters are typically additional components and may either be costly to produce or may fully prevent flattening of the compression bead.

SUMMARY OF THE INVENTION

According to one aspect of the invention, a multi-layer gasket for establishing a fluid-tight seal between a first member and a second member is provided which includes a compression limiter in the form of a stopper for preventing full flattening of a compression bead when the gasket is compressed between the first member, e.g. an engine block, and the second member, e.g. a cylinder head. The gasket has one or more layers, and the stopper has a gear-like shape and is integrally formed with one of the layers through an embossing process. Each tooth of the gear-shaped stopper extends upwardly from a plane by a distance which is less than the height of the compression bead if the gasket has a single layer or the combined heights of the compression beads if the gasket has multiple layers. Accordingly, both of the compression beads extend upwardly from the plane and remain elastically biased against one another, even if the cylinder head is over-loaded onto the engine block. As such, the compression beads are assured of maintaining a generally constant, high sealing pressure against one another, thereby providing and maintaining the gas-tight seal about the circumference of the cylinder bore. In addition to maintaining the desired gas-tight seal about the cylinder bore, the compression beads, by not being over-compressed and completely flattened, remain free from the formation of premature fatigue cracks both during assembly and while in use. Thus, for very little additional cost, the gasket is protected from full flattening of the compression bead, even if the cylinder head is over-loaded onto the engine block.

According to another aspect of the invention, the heights, radial lengths, widths, circumferential spacing and/or the directions of the teeth are varied around the opening. By varying any combination of these parameters, a non-uniform pressure distribution between the compression beads around the opening can be achieved.

BRIEF DESCRIPTION OF THE DRAWINGS

These and other features and advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
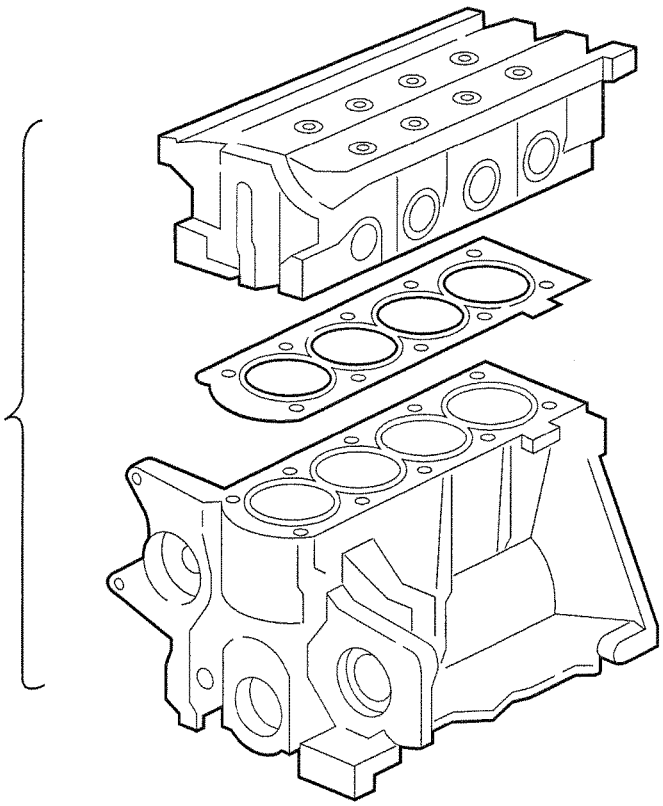
FIG. 1 is an exploded view of a known gasket positioned between a cylinder head and a gasket.
Figure 2:
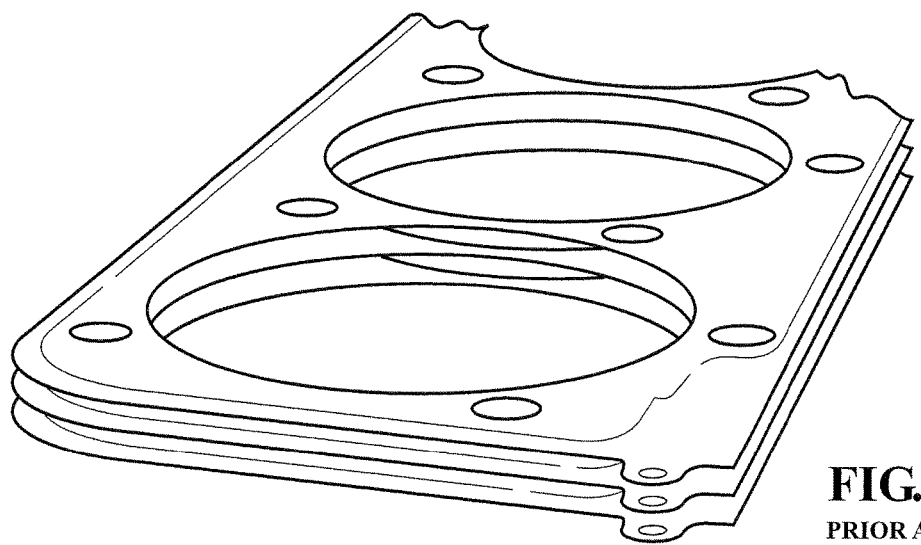
FIG. 2 is a perspective fragmentary view of a known multi-layer gasket.
Figure 3:
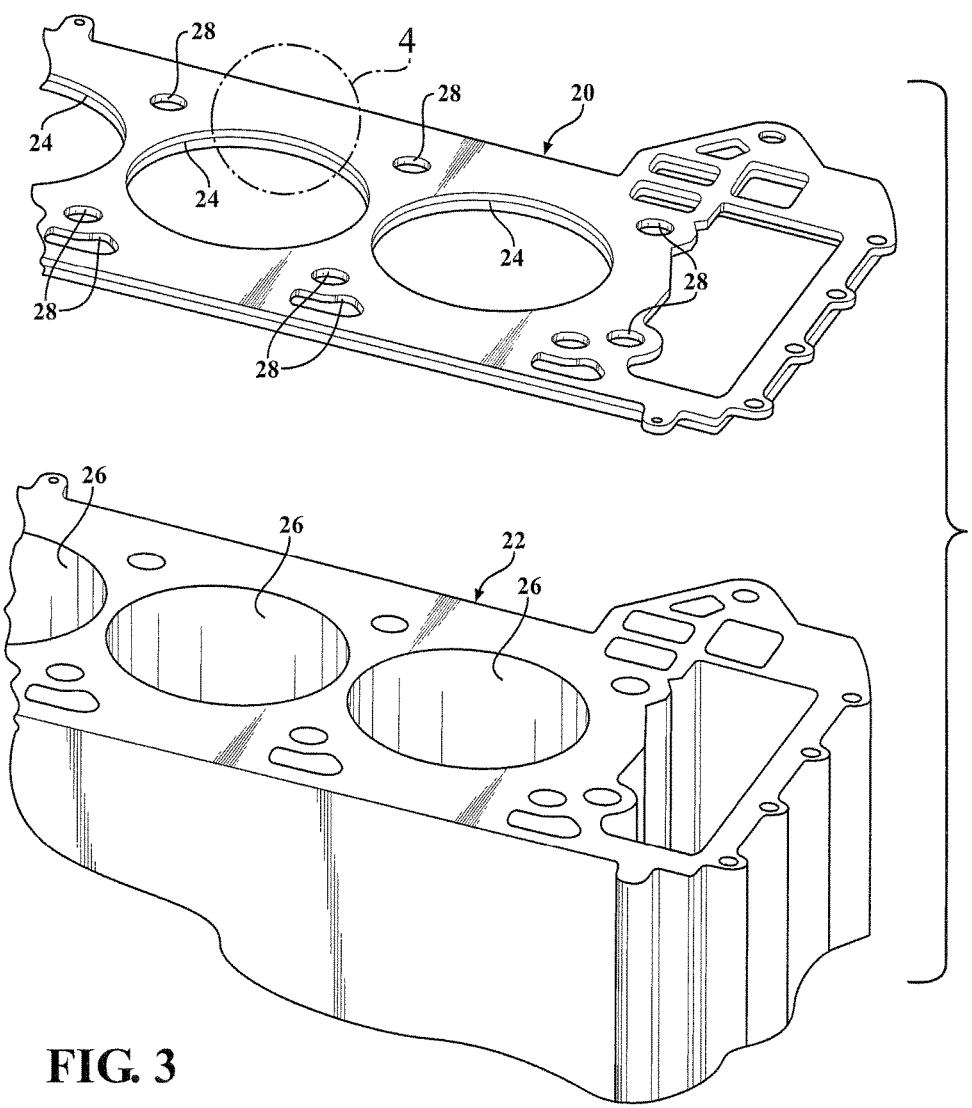
FIG. 3 is an exploded and fragmentary view of an exemplary multi-layer gasket disposed adjacent an engine block.

Referring to the Figures, wherein like numerals indicate corresponding parts throughout the several views, a gasket 20 configured for establishing a seal between a cylinder head (not shown) and an engine block 22 is generally indicated in FIG. 3. The exemplary gasket 20 includes a plurality of large, generally circular openings 24 which correspond with a plurality of cylinder bores 26 in the engine block 22. The gasket 20 also includes a plurality of holes 28 for allowing bolts or fasteners to extend through the gasket or for allowing coolant to flow between the engine block 22 and the cylinder head, as will be understood by those of ordinary skill in the art. Although the exemplary gasket 20 is a cylinder head gasket for use in an internal combustion engine, it should be appreciated that the gasket 20 could be used to seal any desirable members, not just a cylinder head and an engine block 22. Additionally, although each of the embodiments shown in the drawings and discussed below have two layers, it should be appreciated that the gasket could include any desirable number of layers including one layer.

Figure 4:
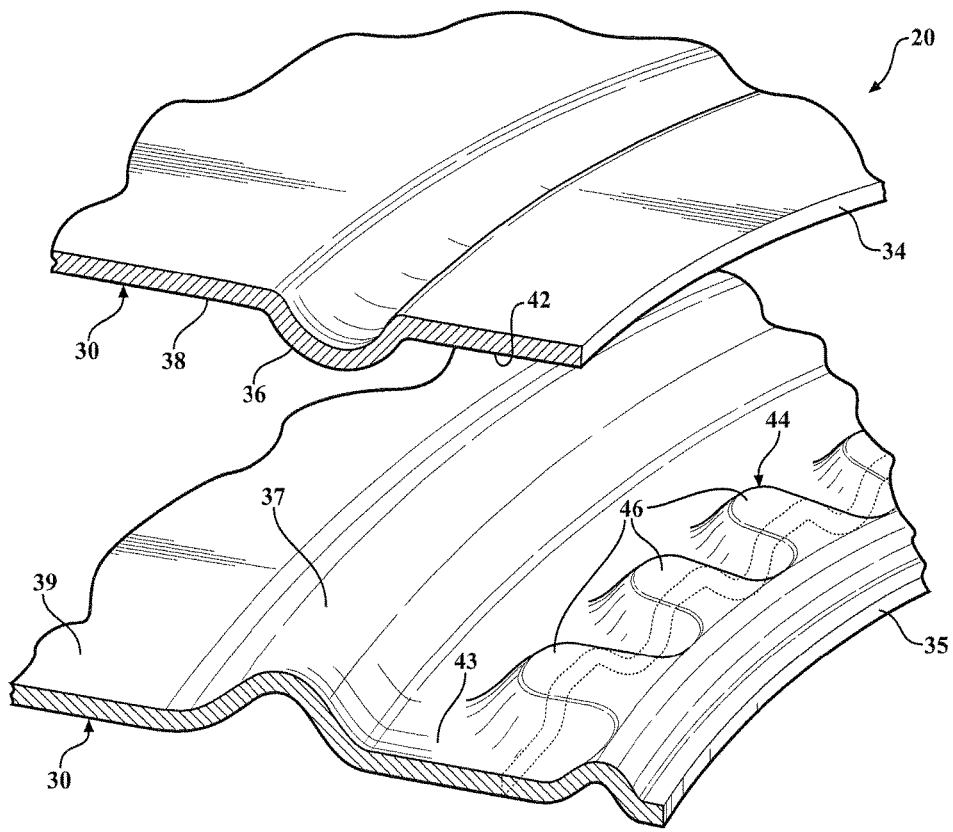
FIG. 4 is an exploded and fragmentary view of a first embodiment of the gasket.

A first embodiment of the gasket 20 is illustrated in FIG. 4. The gasket 20 includes a first functional layer 30 and a second functional layer 32 overlying one another and secured to one another at their outermost peripheries through, for example, welding, brazing or rivets. Each of the functional layers 30, 32 also has an inner periphery 34, 35 defining one of the openings 24 discussed above, as will be understood by those of ordinary skill in the art.

Each of the functional layers 30, 32 also includes a compression bead 36, 37, a main body portion 40, 41 and an inner periphery portion 42, 43. The compression beads 36, 37 are spaced radially from and circumferentially surround the inner peripheries 34, 35. Each of the main body portions 40, 41 extends along a plane 38, 39, and the compression beads 36, 37 extend upwardly from the plane 38, 39. The inner periphery portions 42, 43 extend between the inner peripheries 34, 35 and the compression beads 36, 37 and are generally planar with the main body portions 40, 41. The functional layers 30, 32 are preferably constructed from a resilient material such as spring steel and can have any desirable thickness. The compression beads 36, 37 are preferably formed on the functional layers 36, 37 through an embossing process, as will be understood by those of skill in the art. As shown in FIG. 4, the functional layers 30, 32 are arranged such that the aforementioned compression beads 36, 37 face one another. Thus, when the gasket 20 is compressed between the engine block 22 and the cylinder head, the compression beads 36, 37 engage one another to facilitate a gas-tight seal about the cylinder bore 24, thereby preventing combustion fluids or gasses from escaping the cylinder bore 24 between the cylinder head and the engine block 22.

In contrast to the first functional layer 30, the second functional layer 32 also includes a stopper 44 located on the inner periphery portion 43 between the compression bead 37 and the inner periphery 35 for preventing the compression beads 36, 37 from being completely flattened between the cylinder head and engine block 22, as will be discussed in further detail below. The stopper 44 circumferentially surrounds the opening 24 and has a generally gear-like shape and including a plurality of circumferentially spaced teeth 46 extending out of the plane 39 by a distance which is less than the combined heights of the compression beads 36, 37. Therefore, the compression beads 36, 37 are allowed to contact and seal against one another when the gasket 20 is compressed between the cylinder head and the engine block 22.

The stopper 44 is an integral feature of the second functional layer 32 and is preferably formed through an embossing process, similar to the compression bead 36. The shape and curvature of the teeth 46 provide them with great resistance to flattening, and therefore, when the gasket 20 is compressed between the cylinder head and the engine block 22, the teeth 46 contact the inner periphery portion 42 of the first functional layer 30 and hold the two inner periphery portions 42 apart. Thus, neither of the compression beads 36, 37 can be completely flattened against the other. Accordingly, both of the compression beads 36, 37 extend upwardly from the plane 38 and remain elastically biased against one another, even if the cylinder head is over-loaded onto the engine block 22. As such, the compression beads 36, 37 are assured of maintaining a generally constant, high sealing pressure against one another, thereby providing and maintaining the gas-tight seal about the circumference of the cylinder bore 26. In addition to maintaining the desired gas-tight seal about the cylinder bore 26, the compression beads 36, 37, by not being over-compressed and completely flattened, remain free from the formation of premature fatigue cracks both during assembly and while in use.

Moreover, the stopper 44 itself provides an extra layer of sealing, which further improves the gasket's 20 sealing ability, and also functions as a fire dam to limit the exposure of the compression beads 36, 37 to the combustion fires in the cylinder bore. All of these additional advantages are achieved at a minimal cost because no additional components are required and the stopper 44 can be cheaply and quickly added to the gasket 20 through the embossment process.

In the exemplary gasket 20 of FIG. 4, the teeth 46 have a generally uniform circumferential spacing from one another and all rise above the plane 39 by a similar height. Additionally, all of the teeth 46 extend radially toward the compression bead 37 by a similar distance. Such a stopper 44 might be preferred if a generally uniform sealing pressure is desired around the circumference of the cylinder bore 26. However, as will be discussed in further detail below, if desired, each of these parameters could be varied to provide the gasket 20 with a non-uniform sealing pressure around the cylinder bore 26. For example, it might be desirable to have a wider spacing between teeth 46 in areas where less sealing pressure is required and to have a smaller spacing between teeth 46 in areas where a greater sealing pressure is required.

Figure 5:
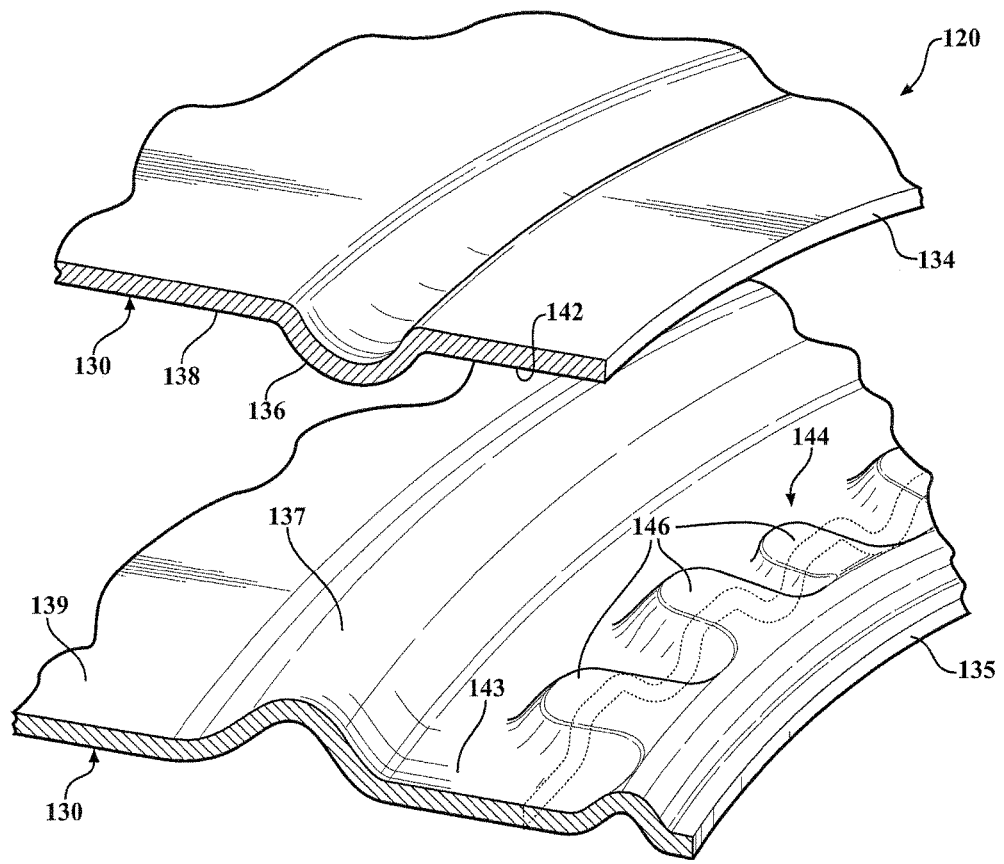
FIG. 5 is an exploded and fragmentary view of a second embodiment of the gasket.

Referring now to FIG. 5, a gasket 120 constructed according to another embodiment is illustrated. Similar to the gasket 20 described above, this gasket 120 includes first and second functional layers 130, 132, each having a compression bead 136, 137. The second functional layer 132 also has a stopper 144 comprising a plurality of teeth 146 disposed in the inner periphery portion 143. As shown in phantom lines, some of the other teeth 146 rise to different heights above the plane 139 than the tooth 146 through which the cross-section was taken. Teeth 146 having different heights will impact uniformity of the pressure exerted between the compression beads 136 around the opening 124. Specifically, more pressure will be exerted between the compression beads 136, 137 if the teeth 146 are shorter, whereas less pressure will be exerted between the compression beads 136, 147 if the teeth 146 are larger.

Figure 6:
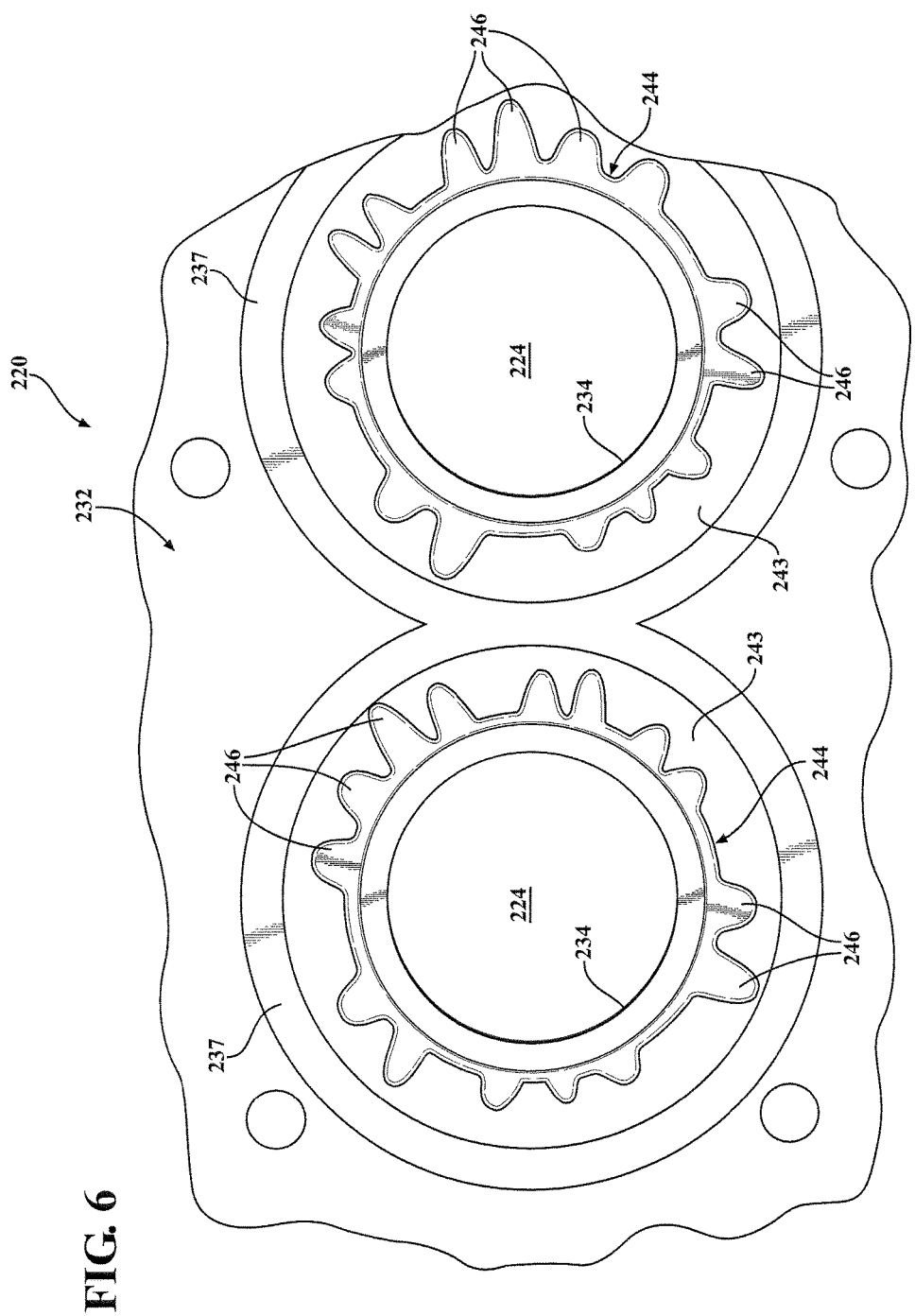
FIG. 6 is a top and fragmentary view of a second functional layer of a third embodiment of the gasket.

Referring now to FIG. 6, the second functional layer 232 of a gasket 220 constructed according to yet another embodiment is shown. Similar to the gaskets 20, 120 described above, the compression beads 237 extend circumferentially around each of the openings 224, and the stoppers 244 are disposed on the inner periphery portions 242 between the inner peripheries 243 and the compression beads 237. In this embodiment, the teeth 246 of the stopper 244 have varying circumferential spacing, varying widths and they extend radially by different distances toward the compression beads 237.

Figure 7:
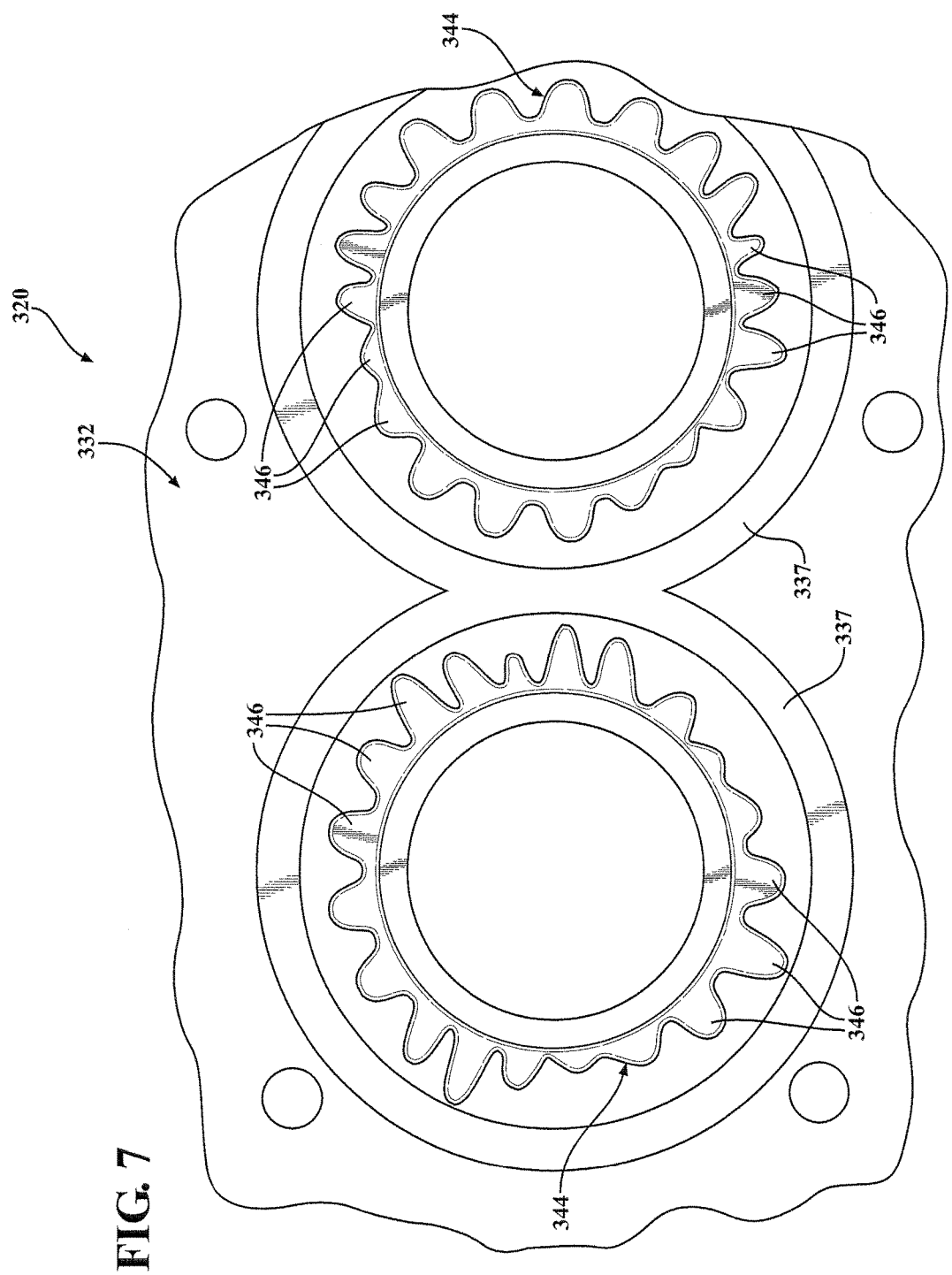
FIG. 7 is a top and fragmentary view of the second functional layer of a fourth embodiment of the gasket.

The second functional layer 332 of a gasket 320 constructed according to another embodiment is shown in FIG. 7. In this gasket 320, the teeth 346 of the stopper 344 are generally uniformly circumferentially spaced from one another but extend radially toward the compression beads 337 by different distances from one another. As discussed above, this could have an impact on the uniformity of the sealing pressure between the compression beads 337.

Figure 8:
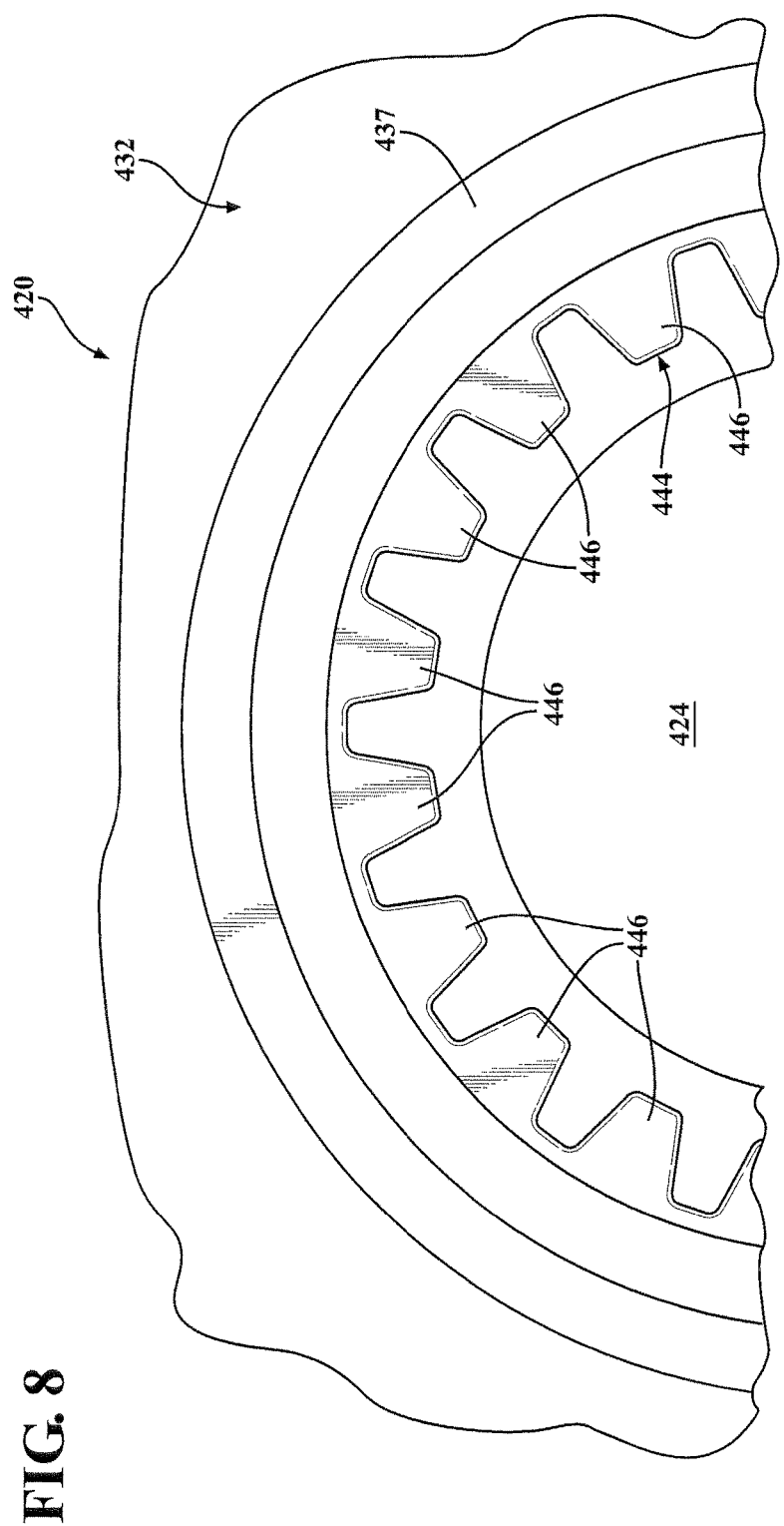
FIG. 8 is a top and fragmentary view of the second functional layer of a fifth embodiment of the gasket.

The second functional layer 432 of a gasket 420 constructed according to yet another embodiment is generally shown in FIG. 8. In contrast to the stoppers 44, 144, 244, 344 described above, the teeth 446 of this stopper 444 extend inwardly toward the opening 424 rather than toward the compression bead 437. This is yet another example of how the stopper 444 can be modified while retaining its ability to prevent flattening of the compression beads 437.

Figure 9:
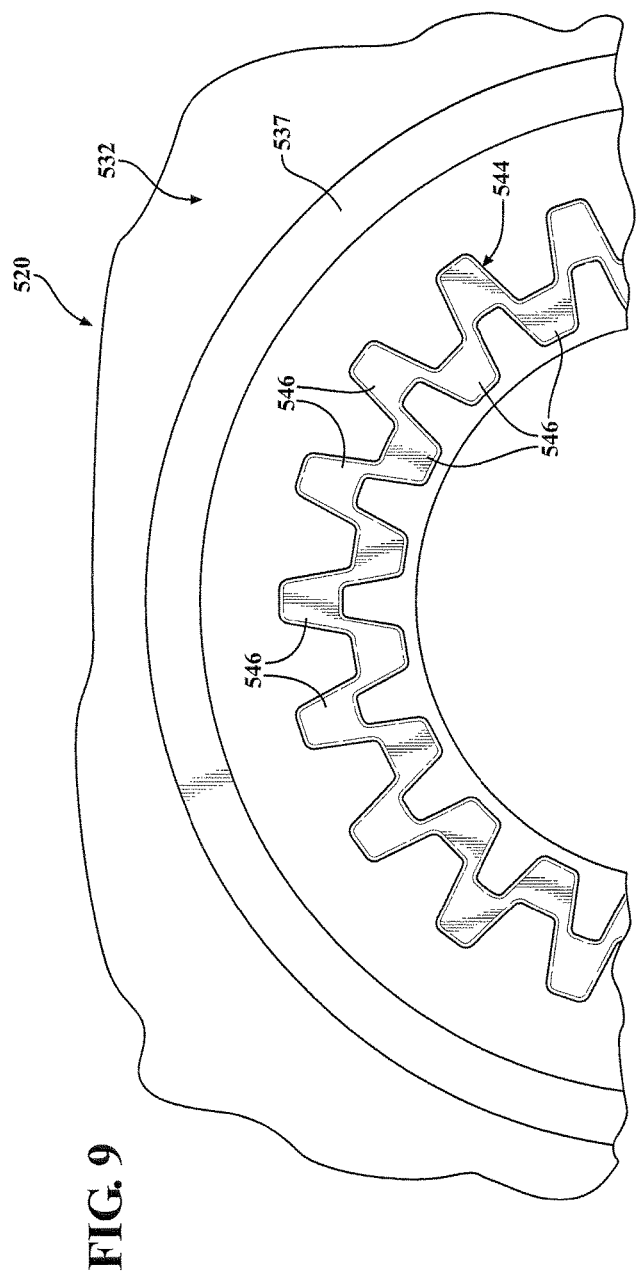
FIG. 9 is a top and fragmentary view of the second functional layer of a sixth embodiment of the gasket.

The second functional layer 532 of a gasket 520 constructed according to yet another embodiment is illustrated in FIG. 9. This gasket 520 is distinguished from the gaskets 20, 120, 220, 320, 420 described above because the teeth 546 of the stopper 544 alternate between extending toward the opening 524 and extending toward the compression bead 537. It should be appreciated that the teeth 546 could take any desirable pattern in order to create a gasket 520 with specific sealing characteristics. For example, it might be desirable to have two teeth 546 to extend toward the compression bead 537 for every tooth 546 extending toward the opening 524.

Figure 10:
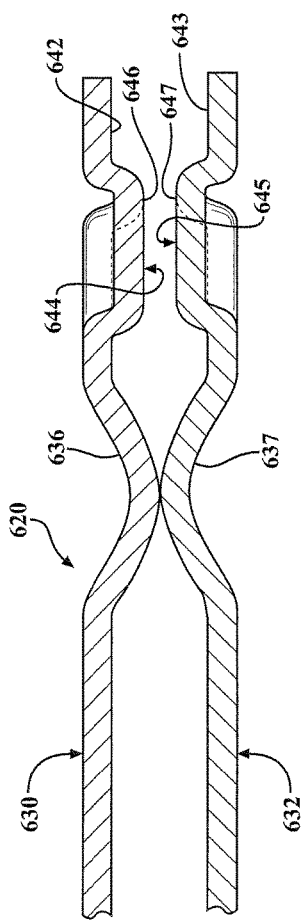
FIG. 10 is a cross-sectional view of a seventh embodiment of the gasket.

Referring now to FIG. 10, a gasket 620 constructed according to a further embodiment is illustrated in cross-section. This embodiment is distinguished from the gaskets 20, 120, 220, 320, 420, 520 described above because both the first and second functional layers 630, 632 have a stopper 644, 645 disposed on their respective inner periphery portions 642, 643. Such a gasket 620 could be advantageous because the functional layers 630, 632 have mirror profiles of one another. In this embodiment, the teeth 646, 647 have a combined height which is less than the combined height of the compression beads 636, 637 to allow the compression beads 636, 637 to contact and seal against one another when the gasket 620 is compressed between the cylinder head and the engine block.

Figure 11:
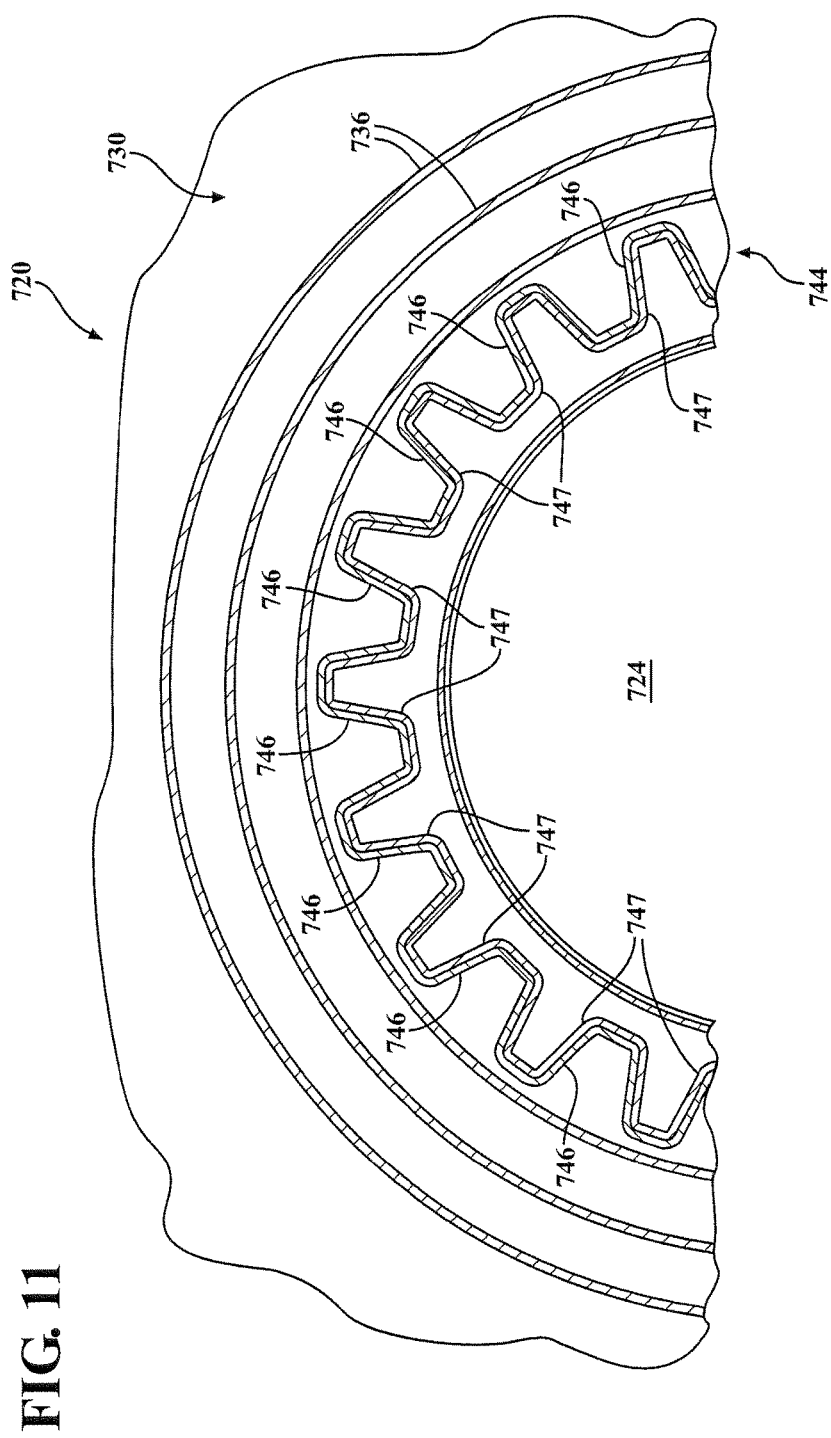
FIG. 11 is a cross-sectional view of an eighth embodiment of the gasket.

Referring now to FIG. 11, still another embodiment of the gasket 720 is illustrated. In this embodiment, the gear teeth 746, 747 of the functional layers 730, 732 are interleaved with one another, i.e. the gear teeth of the first functional layer 730 extend radially inwardly toward the opening 724, and the gear teeth 747 of the second functional layer 732 extend radially outwardly toward the compression bead 736. Because the teeth 746, 747 are interleaved with one another, each should have a height which is less than the combined height of the compression beads 736, 737. Interleaving the teeth 746, 747 could have the effect of strengthening the stopper 744 and/or improving its ability to block combustion gasses from ever reaching the compression beads 736, 737.

It should be appreciated that the gasket could take many forms other than those shown herein. For example, rather than having the compression beads facing toward one another, they could face in the same direction and sealed to one another in a nesting relationship. Additionally, the gasket could include any number of functional layers, and could also include one or more distance layers (not shown), if desired.

Obviously, many modifications and variations of the present invention are possible in light of the above teachings and may be practiced otherwise than as specifically described while within the scope of the appended claims.

What is claimed is:

1. A multi-layer gasket for establishing a fluid-tight seal between a first member and a second member, comprising:
    a first functional layer having at least one opening and at least one compression bead, said at least one compression bead projecting out of a plane of said first functional layer and extending circumferentially about and spaced from said at least one opening;
    a second layer overlying said first functional layer and having at least one opening that is aligned with said at least one opening of said first functional layer;
    said second layer consisting essentially of at least one compression bead and an embossed stopper;
    said at least one compression bead of said second layer projecting out of a plane of said second layer by a predetermined distance;
    said embossed stopper surrounding said aligned openings, said embossed stopper having a stopper bead that is circular in shape, and said embossed stopper having only a single row of circumferentially spaced teeth which extend radially from said second bead towards said aligned openings; and
    said second bead and said teeth extending out of said plane by a distance that is less than said predetermined distance of said at least one compression bead for limiting compression of said at least one compression bead.

2. The multi-layer gasket as set forth in claim 1 wherein said at least one compression bead of said first functional layer is embossed onto said first functional layer.

* * * * *